(12) United States Patent
Uryu et al.

(10) Patent No.: US 6,274,652 B1
(45) Date of Patent: Aug. 14, 2001

(54) COMPOSITE POLYMER MATERIALS AND PROCESS FOR PRODUCING THE SAME

(75) Inventors: Masaru Uryu, Chiba; Kunihiko Tokura, Saitama, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/403,718

(22) PCT Filed: Feb. 24, 1999

(86) PCT No.: PCT/JP99/00847

§ 371 Date: Oct. 25, 1999

§ 102(e) Date: Oct. 25, 1999

(87) PCT Pub. No.: WO99/43748

PCT Pub. Date: Sep. 2, 1999

(30) Foreign Application Priority Data

Feb. 26, 1998 (JP) ................................................ 10-045903

(51) Int. Cl.[7] .............................. A61L 15/00; C08B 1/00; C08J 5/00; C08J 5/04; C08L 1/00
(52) U.S. Cl. .................................. 524/27; 524/35; 524/39; 524/47; 536/123
(58) Field of Search ................................ 524/27, 35, 39, 524/47; 536/123

(56) References Cited

U.S. PATENT DOCUMENTS 4,742,164 * 5/1988 Iguchi et al. ............................ 536/56

FOREIGN PATENT DOCUMENTS

| 61-281800 | 12/1986 | (JP) . |
| 62-36467 | 2/1987 | (JP) . |
| 8-269888 | 10/1996 | (JP) . |

* cited by examiner

Primary Examiner—Nathan M. Nutter
(74) Attorney, Agent, or Firm—Sonnenschein, Nath & Rosenthal

(57) ABSTRACT

A polymeric composite material contains a biodegradable polymeric material that can be biologically decomposed in soil. More specifically, it contains bacterial cellulose including ribbon-shaped micro-fibrils that can be biologically decomposed by microbes in addition to the biodegradable polymeric material and shows improved physical properties including tensile strength. Such a polymeric composite material can be prepared by a method including steps of causing predetermined microbes cultured in a liquid culture medium to produce bacterial cellulose, collecting and drying the produced bacterial cellulose into a powdery state and mixing the powdery bacterial cellulose and a biodegradable polymeric material to produce a composite material.

1 Claim, 1 Drawing Sheet

COMPOSITE POLYMER MATERIALS AND PROCESS FOR PRODUCING THE SAME

This application claims benefit under 35 USC 371 for PCT/JP99/00847 filed Feb. 24, 1999.

BACKGROUND OF THE INVENTION

1. Field of the Invention

This invention relates to a polymeric composite material containing a biodegradable polymeric substance to make it biodegradable in soil and also to a method of manufacturing such a composite material. More specifically, it relates to a composite material of bacterial cellulose and a biodegradable polymeric substance and also to a method of manufacturing such a composite material.

2. Description of the Prior Art

Conventionally, synthetic resin is widely used as material for manufacturing containers for containing various objects and cabinets for housing audio and video apparatus as well as other electronic apparatus.

When disposing used containers and electronic apparatus that are made of synthetic resin as waste, they are mostly incinerated at high temperature in an incineration furnace. When incinerated, synthetic resin decomposes to substances that contaminate air. Attempts have been made to reuse synthetic resin materials in order to bypass the problems that may arise when incinerating synthetic resin. However, the reuse of synthetic resin materials requires a large capital investment for building gigantic incineration facilities and is accompanied by the difficulty of recovering synthetic resin materials showing desired properties.

Particularly, tens of several percent of newly produced synthetic resin materials are currently not reused and simply disposed by way of incineration or by some other means of waste disposal. Synthetic resin materials that are disposed without being incinerated mostly remain in soil or in water to contaminate the environment.

Biodegradable polymeric materials that are decomposed to low molecular weight substances by microbes in soil or in water have been proposed as alternatives that can avoid incineration for waste disposal. In particular, such materials are advantageously used for containers, electronic apparatus and fishing lines.

Then, containers and electronic apparatus made of a biodegradable composite material can be buried for waste disposal in the ground because they are eventually decomposed. Therefore, they do not have to be incinerated at high temperatures for waste disposal.

A biodegradable polymeric material is used alone or with one or more than one inorganic substances added thereto to form a composite material. More specifically, a biodegradable polymeric material may be used by itself to produce containers and cabinets of electronic apparatus or may be used with one or more than one inorganic substances added thereto to form a composite material that shows improved physical properties and mechanical strength for the products made of it. When used alone, a biodegradable polymeric material normally does not show satisfactory physical properties and hence its scope of application is limited. Therefore, one or more than one inorganic substances are typically added to a biodegradable polymeric material in order to improve some of the physical properties of its products and enlarge the scope of application.

When one or more than one inorganic substances are added, a biodegradable polymeric material can contaminate the natural environment if buried in the ground because all or some of the inorganic substances remain undecomposed in the ground.

Meanwhile, cabinets of audio/video apparatus and other electronic apparatus are required to show excellent physical properties including a strong tensile strength. Therefore, it is normally highly difficult to prepare cabinets of audio/video apparatus and other electronic apparatus by using only a biodegradable polymeric material. Thus, a biodegradable polymeric material is normally used with one or more than one inorganic substances added thereto to prepare cabinets of electronic apparatus that show an enhanced degree of tensile strength.

SUMMARY OF THE INVENTION

Therefore, it is an object of the present invention to provide a polymeric material that can be decomposed with ease when buried in soil and shows improved physical properties to ensure a remarkable mechanical strength when used to form containers and electronic apparatus. Another object of the invention is to provide a method of manufacturing such a polymeric material.

A polymeric composite material according to the invention contains bacterial cellulose including ribbon-shaped micro-fibrils and a biodegradable polymeric material.

Of a polymeric composite material according to the invention, the bacterial cellulose and the biodegradable polymeric material can be biologically decomposed by respective microbes living in soil and/or in water and the bacterial cellulose can improve various physical properties of the polymeric composite material including the tensile strength thereof.

According to the present invention, there is also provided a method of manufacturing a polymeric composite material comprising steps of causing predetermined microbes cultured in a liquid culture medium to produce bacterial cellulose, collecting and drying the produced bacterial cellulose into a powdery state and mixing the powdery bacterial cellulose and a biodegradable polymeric material to produce a composite material.

Since this manufacturing method employs powdery bacterial cellulose, the bacterial cellulose and the biodegradable polymeric material can be mixed well to produce a composite material without difficulty. In other words, the bacterial cellulose can be dispersed into the biodegradable polymeric material with ease.

Other objects and advantages of the present invention will become apparent from the following description on examples.

DESCRIPTION OF THE PREFERRED EMBODIMENT

Figure 1:
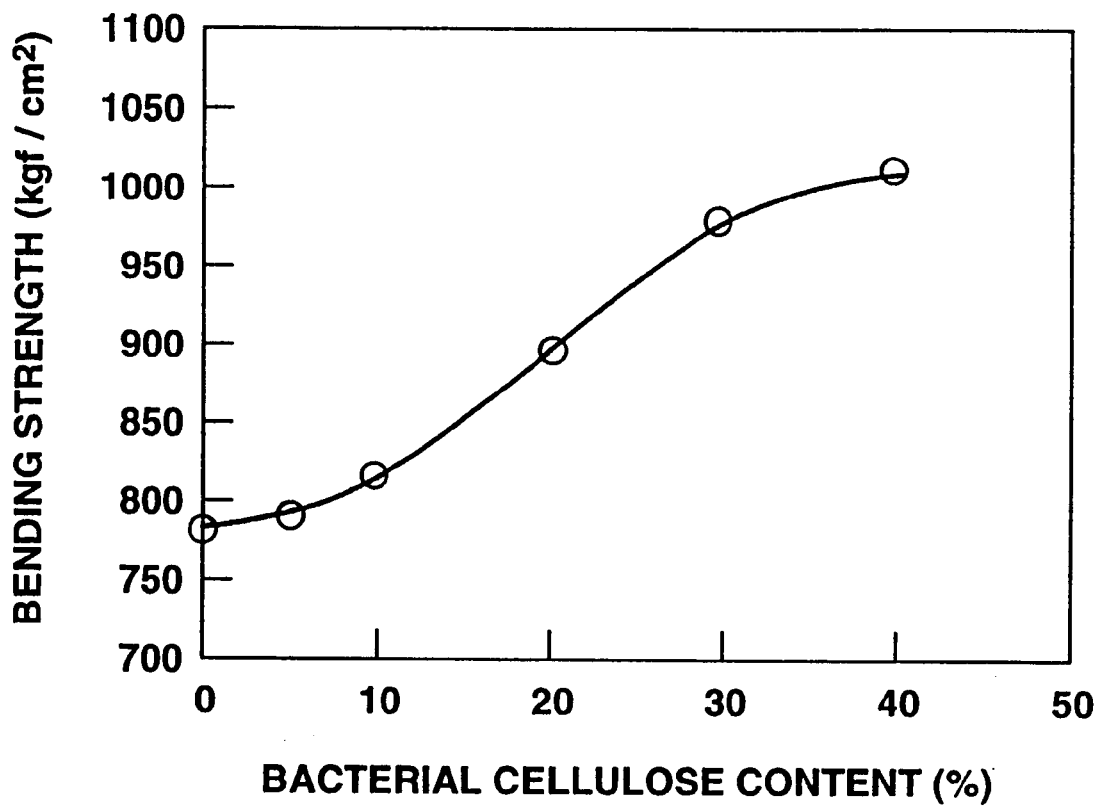
FIG. 1 is a graph showing the relationship between the content of the bacterial cellulose contained in a polymeric composite material and the bending strength of the material.

Now, a polymeric composite material and a method of manufacturing the same according to the invention will be described in greater detail.

A polymeric composite material according to the invention contains bacterial cellulose including ribbon-shaped micro-fibrils and a biodegradable polymeric material.

For the purpose of the invention, bacterial cellulose includes ribbon-shaped micro-fibrils with a width between 100 Å and 500 Å and a thickness between 10 Å and 200 Å that are produced by microbes as will be described in greater detail hereinafter.

Such bacterial cellulose is generally obtained in the form of gel containing water by not less than 95% weight per volume ("w/v"). Bacterial cellulose is easily decomposed by cellulose to produce glucose. More specifically, cellulose (EC3, 2, 1, 4) (tradename: available from Amano Pharmaceuticals) is dissolved in a 0.1% suspension (w/v) of bacterial cellulose by 0.5% (w/v) and made to react with the latter in a 0.1M acetic acid buffer solution at 30° C. for 24 hours. Then, the bacterial cellulose is partly dissolved to produce glucose as principal product. This can be proved because cellobiose, cellotriose and other cello-oligosaccharides are detected to a small extent in addition to glucose when the supernatant of the suspension is developed on a paper chromatography. Saccharides such as fructose and mannose may also be found by a small amount.

Therefore, bacterial cellulose that can be used for forming a polymeric composite material for the purpose of the invention contains cellulose and hetero-oligosaccharides where cellulose is operating as principal chain or glucans such as β-1, 3 and β-1, 2 glucans. Bacterial cellulose containing hetero-oligosaccharides also contains as components hexa-saccharides, penta-saccharides and organic acids such as mannose, fructose, galactose, xylose, arabinose, rhamnose and glucuronic acid.

Bacterial cellulose to be used for the purpose of the invention may contain a single polysaccharide or two or more than two polysaccharides existing in a mixed state under the effect of hydrogen bonds.

Bacterial cellulose of any of the listed described types may be used for a polymeric composite material according to the invention.

Examples of microbes that can produce such bacterial cellulose include, but not limited to, *Acetobacter aceti* subspecies *xylinum* (ATCC 10821), *Acetobacter pasteurianus, Acetobacter rancens, Sarcina ventriculi, Bacterium xyloides, pseudomonades* and Agrobacteria.

Any known method for culturing microbes can be used to culture any of such microbes and obtain bacterial cellulose for the purpose of the invention. Thus, microbes will be implanted into an ordinary nourishing culture medium containing sources of carbon, nitrogen, inorganic salts and, if necessary, a trace of organic nutrients such as amino-acid and Vitamins and the culture medium will be laid in a stationary state or agitated and aerated. Sources of carbon that can be used for the purpose of the invention include glucose, sucrose, maltose, hydrolysates of starch and molasses. Ethanol, acetic acid or citric acid may also be used alone or in combination with any of the above listed sources of carbon. Sources of nitrogen that can be used for the purpose of the invention include ammonium salts such as ammonium sulphate, ammonium chloride, ammonium phosphate, nitrates, urea, peptone and other organic and inorganic sources of nitrogen. Inorganic salts that can be used for the purpose of the invention include phosphates, magnesium salts, calcium salts, iron salts and manganese salts. Sources of a trace of organic nutrients that can be used for the purpose of the invention include amino acids, Vitamins, aliphatic acids and nucleic acids as well as peptone, kazamino acids, yeast extracts and hydrolysates of soybean proteins that contain any of the above organic nutrients. When using an auxotrophic mutant that needs amino acids for growth, the necessary nutrients will have to be added to culture medium.

When microbes are cultured in an appropriate culture medium with a pH level of 5 to 9 for a period between 1 and 30 days, keeping the temperature between 20° C. and 40° C., bacterial cellulose will be accumulated in the form of gel on the surface of the culture medium. The general conditions that need to be met for culturing microbes will also have to be met for culturing microbes that produce bacterial cellulose for the purpose of the invention.

Bacterial cellulose that can be used for a polymeric composite material according to the invention may be highly refined once isolated from the culture of microbes or contain impurities to a certain extent depending on the application. For example, any of the saccharides, the salts and the yeast extracts remaining in the liquid culture medium may also remain in the obtained bacterial cellulose. Additionally, the obtained bacterial cellulose may contain microbes to a certain extent.

Biodegradable polymeric materials that can be used for a polymeric composite material according to the invention have a common characteristic feature, namely they are decomposed to low molecular weight substances by microbes. Such materials are classified into a microbe-produced type, a chemical synthesis type and a natural polymer type.

Biodegradable polymeric materials of the microbe-produced type are produced by using microbes that can produce polyesters as energy storing substances, activating the microbes for fermentation under optimal conditions. Specific examples of biodegradable polymeric materials of the microbe-produced type include polyhydroxybutyrate/valerate and poly-β-hydroxybutyrate.

Biodegradable polymeric materials of the chemical synthesis type are chemically synthesized polymeric materials that are typically produced by microbes through decomposition such as aliphatic polyesters. Specific examples of biodegradable polymeric materials of the chemical synthesis type include polycaprolactone, polybutylenesuccinate, polybutylenesuccinate/adipate, polyethylenesuccinate, polylactic acid and polyvinylalcohol.

Biodegradable polymeric materials of the natural polymer type are prepared on the basis of natural polymeric materials such as starch and cellulose and chemically modified to improve the physical properties such as strength and the ability to repel water. Specific examples of biodegradable polymeric materials of the natural polymer type include starch/synthetic biodegradable plastic, cellulose acetate, chitosan/cellulose/starch and denatured starch.

As pointed out above, a polymeric composite material according to the invention is prepared by forming a composite material from bacterial cellulose and biodegradable polymeric material in a manner as described in detail hereinafter.

A polymeric composite material according to the invention contains bacterial cellulose comprising ribbon-shaped micro-fibrils. Such bacterial cellulose can improve some of the physical properties of the biodegradable polymeric material such as tensile strength. Some of the physical properties of the biodegradable polymeric material such as tensile strength are greatly improved by the bacterial cellulose comprising ribbon-shaped micro-fibrils.

Thus, a polymeric composite material according to the invention and having such improved physical properties can suitably be used for cabinets of audio/video apparatus that require a level of mechanical strength that cannot be achieved by any known biodegradable polymeric material alone and also for containers that require an enhanced level of mechanical strength. A polymeric composite material according to the invention is molded to cabinets of audio/video apparatus and containers typically by injection molding using a metal mold.

For the purpose of the invention, a polymeric composite material according to the invention preferably contains bacterial cellulose by not less than 1% relative to the biodegradable polymeric material. When the polymeric composite material contains bacterial cellulose by not less than 1% relative to the biodegradable polymeric material, some of its physical properties are improved and the molded products made of the material will show a remarkably enhanced level of mechanical strength.

FIG. 1 is a graph illustrating the relationship between the bacterial cellulose content of a polymeric composite material according to the invention and the bending strength of the material. As clearly seen from FIG. 1, the polymeric composite material shows a significantly improved bending strength when it contains bacterial cellulose by not less than 1% if compared with any polymeric material that does not contain bacterial cellulose. It is also clear from FIG. 1 that the polymeric composite material shows a greatly improved bending strength when it contains bacterial cellulose by about 30% if compared with any single biodegradable polymeric material. For the purpose of the present invention, the bacterial cellulose content of a polymeric composite material according to the invention preferably does not exceed 99%. If the bacterial cellulose content exceeds 99%, the physical properties of the biodegradable plurality of material contained in it cannot become apparent.

Both the bacterial cellulose comprising ribbon-shaped micro-fibrils and the biodegradable polymeric material of a polymeric composite material according to the invention are biodegradable. Therefore, when left in soil or in water, the polymeric composite material will be decomposed to low molecular weight substances by microbes living in soil or in water. It may eventually be decomposed to carbon dioxide and water. When the polymeric composite material is eventually decomposed to carbon dioxide and water, it no longer contaminates soil nor water to a great advantage of our environment.

Since a polymeric composite material according to the invention is decomposed by microbes living in soil or in water, it no longer requires the use of a high temperature incinerator when it is disposed as waste. Contrary, it may simply be buried in soil for waste disposal without giving rise to any adverse effect.

As described above, a polymeric composite material according to the invention can provide a sufficient level of mechanical strength and a remarkable property of being biodegradable to containers and cabinets of electronic apparatus molded from the material. Thus, it can advantageously be used for large cabinets of audio/video apparatus and large containers that need to show an enhanced level of mechanical strength. After a prolonged service life, such cabinets and containers can be disposed in a simple manner as waste.

Now, a method of manufacturing a polymeric composite material according to the invention will be described.

For manufacturing a polymeric composite material according to the invention, firstly microbes of any of the above listed species are cultured in a liquid culture medium to encourage them to produce bacterial cellulose.

For a method of manufacturing a polymeric composite material according to the invention, a typical nourishing culture medium for culturing microbes that contains sources of carbon, nitrogen inorganic salts and, if necessary, a race of amino acids, Vitamins and other organic nutrients as described above may be used.

Any of the above described species of microbes may be used for a method of manufacturing a polymeric composite material according to the invention. Since they are generally aerobic, they may have to be fed with oxygen in the culture medium. Therefore, preferably the culture medium is laid in a stationary state or agitated and aerated.

The bacterial cellulose produced by the cultured microbes is then collected, dried and then made powdery. At this stage, the bacterial cellulose is preferably macerated before it is dried because some of the physical properties of bacterial cellulose including the tensile strength are improved by maceration. For the purpose of the invention, such maceration is realized by mechanically applying shearing force to the solution containing the bacterial cellulose typically by means of a rotary macerator or a rotary mixer. After the maceration, the bacterial cellulose may preferably be compressed.

The bacterial cellulose obtained by culturing microbes is then collected and dispersed into an organic solvent such as acetone for dehydration. The collected bacterial cellulose is almost free from moisture. Subsequently, the acetone containing the bacterial cellulose is replaced by cyclohexane and then the bacterial cellulose is dried typically by means of a freeze-drying technique to make it practically free from moisture. Now, the bacterial cellulose is almost completely free from moisture and in a powdery state.

Thereafter, the powdery bacterial cellulose and the biodegradable polymeric material are mixed to produce a composite material.

As described above, the biodegradable polymeric material can be decomposed to low molecular weight substances by microbes and is of the microbe-produced type, the chemical-synthesis type or the natural polymer type. The powdery bacterial cellulose is mixed with the biodegradable polymeric material to produce a composite material. A mill may be used for the process of producing the composite material.

Thus, the composite material produced by mixing the biodegradable polymeric material and the bacterial cellulose with each other shows excellent physical properties including tensile strength and can be biologically completely decomposed.

Since the collected bacterial cellulose is turned powdery before it is mixed with the biodegradable polymeric material to produce a composite material by the method of the present invention, the bacterial cellulose and the biodegradable polymeric material can produce a biodegradable polymeric composite material with ease.

Now, the present invention will be described in greater detail by way of examples where a polymeric composite material according to the invention was prepared. Comparative examples involving the use of a biodegradable plurality of material alone will also be described for the purpose of comparison.

EXAMPLE 1

In Example 1, bacterial cellulose was prepared in a manner as described below. *Acetobacter aceti* subspecies *xylinum* (ATCC 10821) is cultured in a sloped culture medium of agar arranged in a test tube at 30° C. for 3 days in the ambient atmosphere. The sloped culture medium of agar arranged in the test tube had the following composition.

<Sloped Culture Medium of Agar in the Test Tube>

| | |
|---|---|
| mannitol | 2.5 [g/dl] |
| yeast extracts | 0.5 [g/dl] |
| peptone | 0.3 [g/dl] |

Then, microbes were implanted in a liquid culture medium in a glass petri dish by a spoonful in term of a tiny platinum spoon and cultured at 30° C. for 30 days in the ambient atmosphere. The liquid culture medium had the following composition and sterilized by vapor at 120° C. for 20 minutes before implanting the microbes.
<Liquid Culture Medium>

| | |
|---|---|
| sucrose | 5.0 [g/dl] |
| yeast extracts | 0.5 [g/dl] |
| ammonium sulphate | 0.5 [g/dl] |
| potassium phosphate | 0.3 [g/dl] |
| magnesium sulphate | 0.005 [g/dl] |

Then, bacterial cellulose contained in the supernatant of the liquid of the culture medium in the form of white gel was taken out, washed with water, immersed in a 5% aqueous solution of sodium hydroxide for 2 days and then washed with water once again. As a result, the impurities such as proteins originating from the culture medium are eluted out.

Subsequently, the bacterial cellulose in the form of gel that had been washed with water was macerated and then dried.

In the maceration process, an ethyl alcohol solution of bacterial cellulose was prepared to make it show a bacterial cellulose concentration of 0.5% and then the bacterial cellulose was macerated via home-use mixer for 15 minutes to produce a dispersed solution of bacterial cellulose. Then, the dispersed solution was filtered through a 150 [mesh] filter to isolate the macerated bacterial cellulose.

When drying the bacterial cellulose, a step of dispersing the macerated bacterial cellulose into acetone and filtering the solution through a 150 [mesh] filter was repeated five times and subsequently the acetone was replaced by cyclohexane. Then, the solution was freeze-dried at −10 to 0° C. to obtain dried powdery bacterial cellulose.

Thereafter, powdery bacterial cellulose and the biodegradable polymeric material was mixed with each other to produce a composite material. The process of producing a composite material was conducted in a labo-plasto-mill (available from Toyoseiki Manufacturing) provided with a heating means and a mixing means which was a screw. Thus, both the powdery bacterial cellulose and the biodegradable polymeric material were heated and fused while they mixed into a composite material in the labo-plasto-mill. In Example 1, polylactic acid (Lacty: tradename, available from Simadzu Seisakusho) was used for the biodegradable polymeric material and the bacterial cellulose was mixed with the biodegradable polymeric material to a ratio of 30:70 by weight. The screw of the labo-plasto-mill used for compositing the powdery bacterial cellulose and the biodegradable polymeric material was driven with a rate of revolutions of 10 [rpm] and the temperature of the compositing process was held to 180° C. to 200° C.

The polymeric composite material of Example 1 was prepared as a result of following the above procedures.

EXAMPLE 2

In Example 2, the procedures of Example 1 were followed to produce a polymeric composite material except that aliphatic polyester (Bionore: tradename, available from Showa Kobunshi) was used for the biodegradable polymeric material and the compositing operation was conducted in the above labo-plasto-mill at 150 to 160° C.

Comparative Example 1

In Comparative Example 1, the procedures of Example 1 were followed except that polylactic acid (Lacty: tradename, available from Shimadzu Seisakusho) was used for the biodegradable polymeric material.

Comparative Example 2

In Comparative Example 2, the procedures of Example 2 were followed except that aliphatic polyester (Bionore: tradename, available from Showa Kobunshi) alone was used for the biodegradable polymeric material.

[Evaluation of the Physical Properties]

Strip-shaped specimens with dimensions of 5×50×1 [mm] were prepared from the polymeric composite materials of Examples 1 and 2 and Comparative Examples 1 and 2 by injection molding and certain physical properties of the specimens were tested and evaluated in a manner as listed in Table 1 below.

Although modifications and changes may be suggested by those skilled in the art, it is the intention of the inventors to embody within the patent warranted hereon all changes and modifications as reasonably and properly come within the scope of their contribution to the art.

TABLE 1

| | Unit | measurement method |
|---|---|---|
| tensile strength | kgf/cm$^2$ | ASTMD638 |
| ratio of expansion at tensile breakage | % | ASTMD638 |
| bending strength | kgf/cm$^2$ | ASTMD790 |
| bending modulus of elasticity | kgf/cm$^2$ | ASTMD790 |
| Izod strength | kgf/.cm/cm | JIS K7110 |

Table 2 below summarily shows the results obtained by preparing strip-shaped specimens with dimensions of 5×50×1 [mm] from the polymeric composite materials of Examples 1 and 2 and Comparative Examples 1 and 2 by injection molding and testing certain physical properties of the specimens in a manner as listed in Table 1.

TABLE 2

| | Com. Ex. 1 | Example 1 | Com. Ex. 2 | Example 2 |
|---|---|---|---|---|
| tensile strength | 680 | 884 | 150 | 380 |
| ratio of expansion at tensile breakage | 4 | 2.5 | 430 | 340 |
| bending strength | 784 | 980 | 160 | 500 |
| bending modulus of elasticity | 34000 | 49300 | 6500 | 21000 |
| Izod strength | 2.7 | 5.1 | 7.5 | 6.3 |

As seen from Table 2, while the specimen of Example 1 showed a ratio of expansion at tensile breakage little lower than that of Comparative Example 1, it showed values greatly higher for all the other listed physical properties than those of Comparative Example 1. Thus, a composite material prepared from polylactic acid and bacterial cellulose shows improved physical properties including tensile strength if compared with polylactic acid. Also as seen from Table 2, while the specimen of Example 2 showed an Izod strength slightly lower than that of Comparative Example 2, it showed values greatly higher for all the other listed physical properties than those of Comparative Example 2. Thus, a composite material prepared from aliphatic polyester and bacterial cellulose shows improved physical properties including tensile strength if compared with aliphatic polyester.

The specimens of Examples 1 and 2 and Comparative Examples 1 and 2 were also tested for biodegradability. More specifically, strip-shaped specimens with dimensions of 5×50×1 [mm] were prepared from the polymeric composite materials of Examples 1 and 2 and Comparative Examples 1 and 2 by injection molding and buried in soil at a same location for 6 months. After the elapse of 6 months, they are weighed and visually observed. Table 3 below summarily shows the obtained results.

TABLE 3

|  | Example 1 | Com. Ex. 1 | Example 2 | Com. Ex. 2 |
| --- | --- | --- | --- | --- |
| Weight reduction (%) | 11.3 | 9.5 | 12.3 | 11.4 |
| Appearance | eroded | eroded | partly eroded | partly eroded |

As seen from Table 3, the specimens of Examples 1 and 2 showed a sufficient level of biodegradability like the specimens of Comparative Examples 1 and 2 prepared solely from a biodegradable polymeric material. It was also found that the specimens of Examples 1 and 2 had been eroded throughly from appearance if compared with those of Comparative Examples.

From the above, it was found that the polymeric composite materials of Examples 1 and 2 showed improved physical properties including tensile strength without sacrificing the biodegradability. Therefore, a polymeric composite material of either of Example 1 and 2 showed an excellent level of biodegradability and can be used for cabinets of audio/video apparatus to provide the required level of mechanical strength.

INDUSTRIAL APPLICABILITY

As described above, a polymeric composite material according to the invention contains bacterial cellulose comprising ribbon-shaped micro-fibrils and a biodegradable polymeric material and shows excellent physical properties including tensile strength and a satisfactory level of biodegradability.

With a method of manufacturing a polymeric composite material according to the invention, bacterial cellulose is collected and dried to show a powdery state and then the powdery bacterial cellulose is mixed with a biodegradable polymeric material to produce a composite material. Therefore, according to the invention, bacterial cellulose and a biodegradable polymeric material can be composited easily and reliably to produce a polymeric composite material having excellent physical properties including tensile strength and also a satisfactory level of biodegradability.

What is claimed is:

1. A polymeric composite material comprising:

(a) a biodegradable polymeric material selected from the group consisting essentially of polyhydroxybutyrate/valerate, poly-β-hydroxybutyrate, polycaprolactone, polybutylenesuccinate, polybutylenesuccinate/adipate, polyethylenesuccinate, polylactic acid polyvinylalcohol, starch/synthetic biodegradable plastic, cellulose acetate, chitosan/cellulose and denatured starch; and (b) a bacterial cellulose having ribbon-shaped micro-fibrils produced by microbes selected from the group consisting of the species of acetobacter, psuedomonades, and agrobacteria, wherein the bacterial cellulose comprises between approximately 1 weight percent to approximately 99 weight percent of the polymeric composite material.

* * * * *